United States Patent Office 3,458,740
Patented July 29, 1969

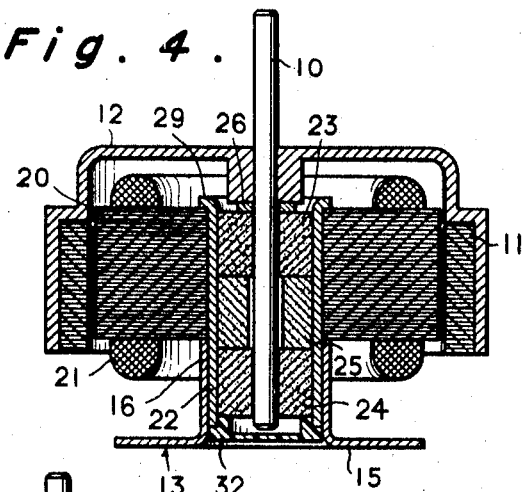
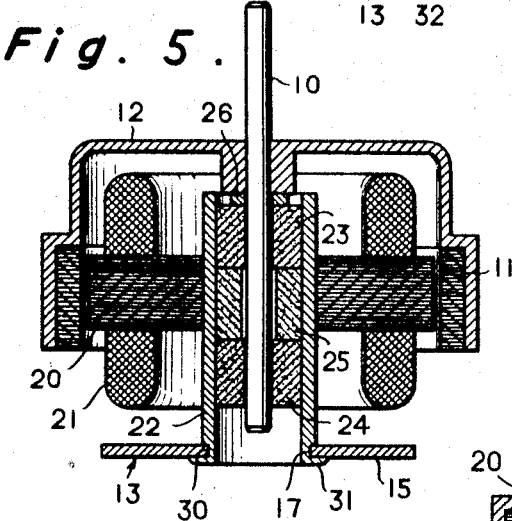
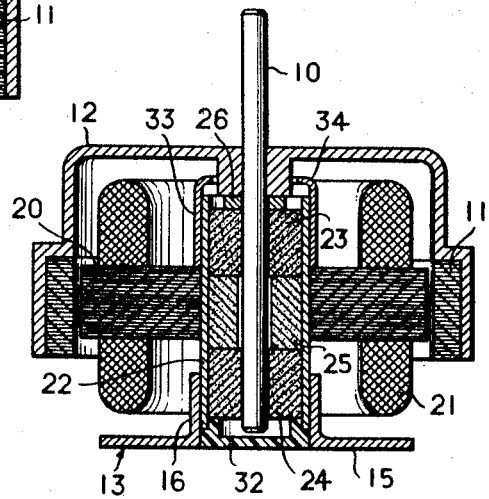

3,458,740
MOTOR OF OUTER ROTOR TYPE
Kansaku Kaneko, Toshimasa Fujiwara, Osamu Samuta, Takao Miyasaka, and Kenichi Kitamura, Yokohama, Japan, assignors to Victor Company of Japan Limited, Kanagawa-ku, Yokohama, Japan
Filed Nov. 28, 1966, Ser. No. 597,388
Claims priority, application Japan, Dec. 2, 1965, 40/97,350, 40/97,351, 40/97,352, 40/97,353, 40/97,354
Int. Cl. H02h 3/00, 5/00
U.S. Cl. 310—67
8 Claims

ABSTRACT OF THE DISCLOSURE

A motor of outer rotor type is disclosed. The illustrated embodiment comprises a supporting member of which a protruding portion is fixedly fitted into one end of the bearing for the rotor shaft. By supporting the bearing for the rotor shaft, the supporting means for the motor is simple and strong in construction and small in size.

---

This invention relates to a motor of outer rotor type and more particularly to a construction of a supporting means for said motor.

Hitherto, a case was provided at the outer side of the rotor as the supporting member, or the supporting member was fixed on the stator by screws or rivets, etc.

According to this invention there is provided in a motor of outer rotor type which is minimum in the number of parts, a simple and strong manner for fixing and supporting said motor bypress fitting the supporting member of the motor into the stator.

A main object of this invention is to provide a motor of outer rotor type which is simple and strong in construction and small in size and which has a low propensity for malfunctioning and lowering in efficiency, by using a portion of the stator effectively as the supporting means of the motor.

Another object of this invention is to provide a motor of outer rotor type which can prevent the generation of heat due to high-speed rotation of the rotor during long periods of operation, by employing only small contacting areas of the rotary shaft.

A further object of this invention is to provide a motor of outer rotor type in which the soiling of the motor by the centrifugal scattering of lubricating oils included in the bearing is suppressed.

Other objects and features of this invention will become apparent from the detailed description taken in conjunction with the accompanying drawings, in which:

FIGURE 4 is a longitudinal sectional side view showing the third embodiment of the motor according to this invention;

FIGURE 5 is a longitudinal sectional side view showing the fourth embodiment of the motor according to this invention; and FIGURE 6 is a longitudinal sectional side view showing the fifth embodiment of the motor according to this invention.

Figure 1:
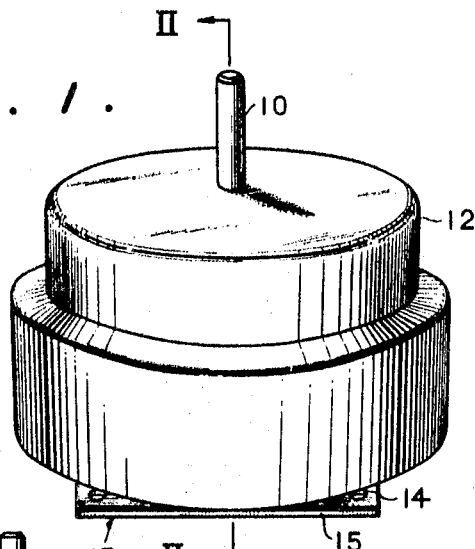
FIGURE 1 is an external perspective view of a motor of outer rotor type constructed in accordance with the present invention.

In FIGURE 1, 10 is a rotary shaft constructed integrally with a rotor and inserted into bearings, 12 is a rotor housing having an opening on one side, and 13 is a motor holder shown as a supporting means constructed in accordance with this invention and is formed by a base plate 15 provided with suitable holes or screw holes 14 for fixing, and a cylindrical protruding portion 16 provided integrally by, for example, press moulding etc. on the center of said base plate.

Figure 2:
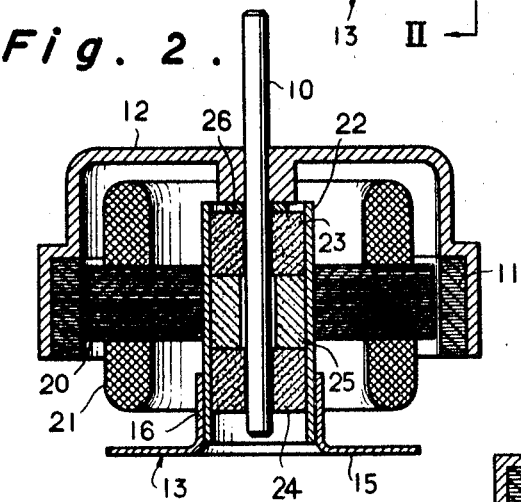
FIGURE 2 is a longitudinal sectional side view showing the first embodiment of the motor taken along line II—II of FIGURE 1.

FIGURE 2 shows one embodiment of the motor according to this invention, wherein 20 is a stator core having a stator coil 21, 22 is a cylindrical bearing holder press fitted into said core, the lower portion of said bearing holder being press fitted into the cylindrical protruding portion 16 of the motor holder 13, and the inner diameter of said cylindrical protruding portion 16 being determined as press fittable with said bearing holder 22, 23 and 24 are the bearings made of porous oil impregnated metal and press fitted into the holder 22, 25 is an insert member made of oil soaked materials such as oil soaked felt etc. including lubricating oil and inserted between the bearings, 11 is a rotor provided integrally with shaft 10 which is supported by said bearings 23 and 24, and 26 is a washer.

As stated above, in this embodiment there is provided a motor, wherein the cylindrical bearing holder is press fitted into the stator core, the bearings and the insert member made of oleo materials are press fitted into the bearing holder, and the motor holder is also press fitted with the lower portion of the bearing holder, thereby the stator is solidly constructed in a simple manner.

Figure 3:
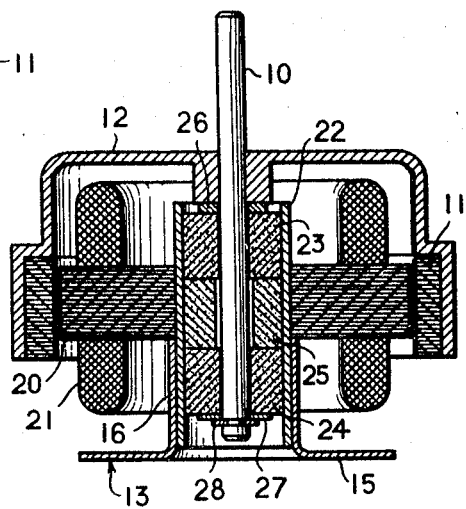
FIGURE 3 is a longitudinal sectional side view showing the second embodiment of the motor according to this invention.

FIGURE 3 shows the second embodiment of the motor according to this invention, wherein the cylindrical protruding portion 16 of the motor holder 13 is extended in an upward direction and the top end thereof is abutted with the lower surface of the stator core 20, so as to obtain exact positioning of the motor holder and to increase the resistance of the motor to impacts etc.

In FIGURE 3, 27 is a washer, and 28 is a fixed collar inserted into a groove provided on the lower end portion of the rotary shaft 10.

FIGURE 4 shows the third embodiment of the motor according to this invention, wherein the upper end portion 29 of the bearing holder 22 is caulked after the stator core 20 is press fitted into the bearing holder 22, so as to solidly hold the stator core 20 between the caulked portion and the top end of the cylindrical protruding portion 16.

FIGURE 5 shows the fourth embodiment of the motor according to this invention, wherein an outer step portion 30, reduced in diameter, is provided on the lower end portion of the cylindrical protruding portion 16 of the bearing holder 22, a hole 17 is provided at the center of the base plate 15 of the bearing holder 22 and the lower end portion 31 of the cylindrical protruding portion 16 is caulked after the step portion 30 is inserted into said hole 17, so as to solidly fix the motor holder 13 with the bearing holder 22.

FIGURE 6 shows the fifth embodiment of the motor according to this invention, wherein a cap 32 made of plastic etc. is fitted into the lower opening of the bearing holder 22 so as to close the opening, and a cylinder 33 having a narrow upper end 34 is mounted on the bearing holder 22 so as to cover the upper opening thereof.

In the above embodiments when the motor is fixed on some places by using the motor holder, and an electric source of two-phases is applied to the stator coil 21 which is connected as a coil of a two-phase motor, a revolving magnetic field is produced at the outside of the stator so that the rotor 11 is rotated. The lubricating oil included in the insert member 25 flows to the bearings 23 and 24 and lubricates them. In the embodiment shown in FIGURE 6, the lower opening of the bearing holder is covered by the cap 32 perfectly, so that there is not any outflow of the lubricating oil.

The lubricating oil flowing to the upper portion is scattered by centrifugal force through a clearance between the upper opening of the bearing holder 22 and the washer, however, the scattering of the oil is prevented by the narrow upper end 34 of the cylinder 33 and the lubricating oil impacted against the inside wall of the cylinder 33 flows to the bearing 23.

As described above, various embodiments of the motor of outer rotor type according to this invention are explained, however, this invention is not limited to the foregoing and many modifications may be made without departing from the spirit of the invention.

What we claim is:

1. A motor of outer rotor type comprising:
    a stator having a stator core provided with a center hole;
    a rotor which rotates around the stator;
    a shaft on which said rotor rotates;
    bearing means for the shaft of said rotor which includes a bearing holder fixedly fitted into said center hole of the stator core, two bearing members made of a porous oil impregnated metal and fixedly fitted into said bearing holder, and an oil soaked fibre member inserted between said bearing members;
    a supporting member including a base plate and a cylindrical protruding portion at the center thereof, one end portion of said bearing holder being fixedly fitted into said protruding portion; and
    a cylinder having a cylindrical end and a narrow end, said cylindrical end being fixedly fitted into the other end portion of said bearing holder.

2. The motor as recited in claim 1 and further comprising a cap member fixedly fitted into said protruding portion of the supporting member.

3. The motor of claim 1 wherein said cap member is positioned in said protruding portion at the end remote from said bearing holder.

4. The invention as set forth in claim 3 wherein said base plate is provided with a plurality of mounting holes.

5. A motor of outer rotor type comprising:
    a stator having a stator core provided with a center hole;
    a rotor which rotates around the stator;
    a shaft on which said rotor rotates;
    bearing means for the shaft of said rotor which includes a bearing holder fixedly fitted into said center hole of the stator core and provided with a step portion reduced in diameter at one end thereof, two bearing members made of a porous oil impregnated metal and fixedly fitted into said bearing holder, and an oil soaked fibre member inserted between said bearing members;
    a supporting member for fixing the motor having a hole to be fitted adjacent said step portion, said supporting member fixed to said bearing by caulking of said one end of the bearing holder; and
    a cylinder having a cylindrical end and a narrow end, said cylinder being fixedly fitted into the other end portion of said bearing holder.

6. The motor as recited in claim 5 and further comprising a cap member fixedly fitted into said protruding portion of the supporting member.

7. The motor of claim 5 wherein said cap member is positioned in said protruding portion at the end remote from said bearing holder.

8. The motor of claim 7 wherein said cap member is positioned in said protruding portion at the end remote from said bearing holder.

References Cited

UNITED STATES PATENTS

| | | | |
|---|---|---|---|
| 1,409,148 | 3/1922 | Apple | 310—90 |
| 1,618,877 | 2/1927 | Henry. | |
| 2,064,070 | 12/1936 | Mapes et al. | 310—157 |
| 2,193,713 | 3/1940 | Cole. | |
| 2,207,251 | 7/1940 | Guedon | 310—157 |
| 2,226,622 | 12/1940 | Lignian. | |
| 2,406,891 | 9/1946 | Newton et al. | |
| 2,628,138 | 2/1953 | Blood. | |
| 704,327 | 7/1902 | Heck | 310—90 |

FOREIGN PATENTS

| | | |
|---|---|---|
| 401,797 | 11/1933 | Great Britain. |
| 848,499 | 10/1939 | France. |

MILTON O. HIRSHFIELD, Primary Examiner

M. O. BUDD, Assistant Examiner

U.S. Cl. X.R.

310—90, 157